June 18, 1940.  E. D. TILLYER  2,204,631
EYE PROTECTING DEVICE
Filed Dec. 22, 1937  2 Sheets-Sheet 1
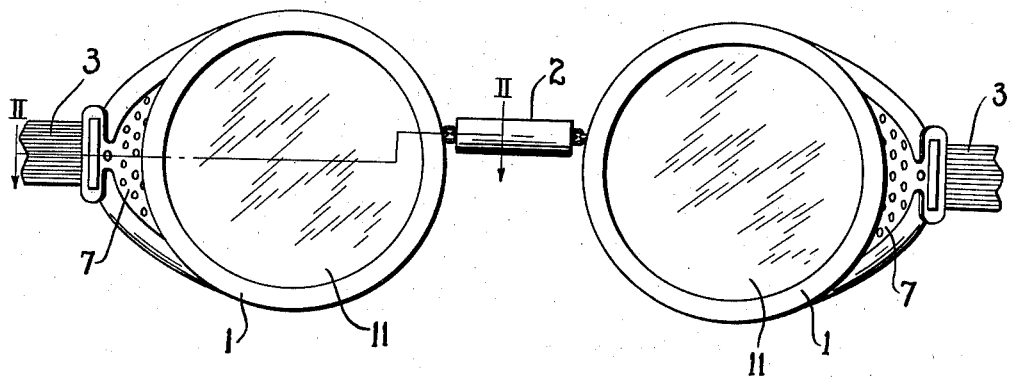
Fig. I
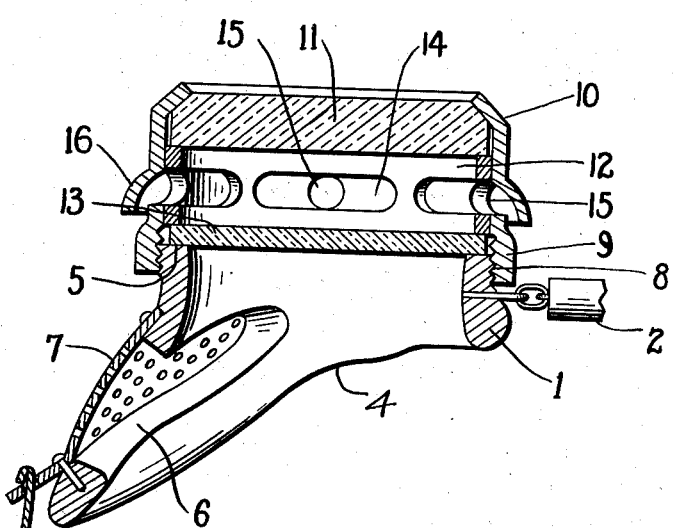
Fig. II
INVENTOR
EDGAR D. TILLYER
BY
Harry H. Stull
ATTORNEY

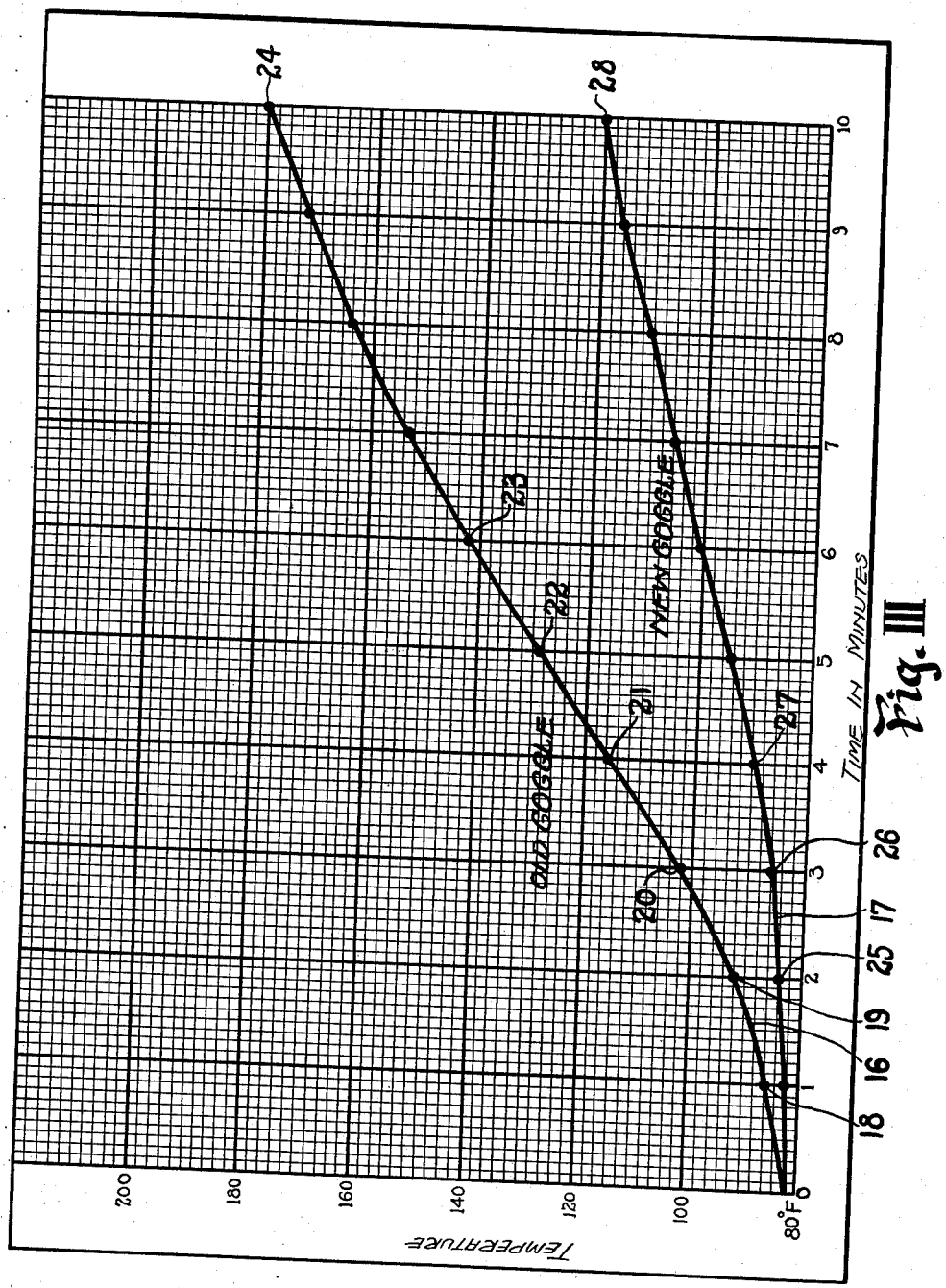

Patented June 18, 1940

2,204,631

UNITED STATES PATENT OFFICE 2,204,631

EYE PROTECTING DEVICE

Edgar D. Tillyer, Southbridge, Mass., assignor to American Optical Company, Southbridge, Mass., a voluntary association of Massachusetts Application December 22, 1937, Serial No. 181,139

5 Claims. (Cl. 2—14)

This invention relates to improvements in eye protection devices.

One of the principal objects of this invention is to provide an eye protection device whereby heat radiations from high temperature sources may be more efficiently absorbed and prevented from reaching the eyes of an individual who is exposed to such heat radiations.

Another object of the invention is to provide an eye protection device for eyes exposed to heat radiations from high temperature sources having means for intercepting said heat waves which when hot will radiate a wave length which can be absorbed by a transparent lens medium.

Another object of the invention is to provide a novel means of ventilating a device of the above character.

Another object is to provide novel means for shielding the eyes against high temperatures.

Other objects and advantages of the invention should become apparent from the following descriptions taken in connection with the accompanying drawings and it will be apparent that many changes may be made in the details of construction, arrangement of parts shown and described without departing from the spirit of the invention as expressed in the accompanying claims. I, therefore, do not wish to be limited to the exact details, and arrangements shown and described as the preferred form only has been given by way of illustration.

Referring to the drawings:

Fig. I is a front elevation of the device embodying the invention;

Fig. II is a sectional view taken as on line II—II of Fig. I and looking in the direction indicated by the arrows; and Fig. III is a graph setting forth the advantages of the device embodying the invention over one of the most practical devices now in commercial use.

Eye protection devices for use in protecting the eyes of an individual which are exposed to heat radiations of high temperature, for example, for use during welding, foundry work or the like, have been sold commercially over a period of years. The problem involved is to provide such a protection device, which, in addition to reducing glare and so forth, will also protect the eyes against infra-red rays or heat from relatively high temperature sources and which will also enable sufficient visibility so as to not in any way be of a detriment to the user.

In dealing with this problem lenses have been developed which will absorb heat radiations and which will reduce the visible spectrum to such an extent as to protect the eye from glare, etc.

The difficulty, however, with most of the known prior art devices embodying such lenses has been that these lenses soon become hot and, because of their close proximity with the eyes, were troublesome and in many instances caused the wearer to cease activities or to remove such protection devices in order to permit them to cool to such an extent that they could be again brought into use.

This was not only inconvenient to the wearer but in many instances, particularly when the wearer would temporarily remove the device from before his eyes, would expose his eyes to injurious radiations and after repeated exposures his eyes would become seriously affected. This was particularly true when such devices were used in welding and when exposed to high intensity radiation such as comes from molten metal in foundry work and so forth.

Some attempts have been made in the past to overcome the above difficulty by various different types of ventilation for such devices, but with most prior art arrangements a practical and comfortable device could not be obtained, that is, one which could be worn with comfort and without danger of injury to the eye for a relatively long period of time.

One of the principal objects, therefore, of this invention is to provide an eye protection device which will embody all of the desirable features of the prior art as regards reducing the visible spectrum and protecting the eyes against high intensity light or glare and ultra-violet rays, and which will also provide desirable and comfortable means for protecting the eyes against high temperature infra-red radiations.

Referring more particularly to the drawings wherein like characters of reference designate like parts throughout the several views of the device embodying the invention comprising a pair of eye cups 1 connected by bridge means 2 and having a suitable head band 3 for supporting the eye cups before the eyes.

The eye cups which in this particular instance are preferably provided with an edge 4 shaped to engage and fit the orbital brim of the respective eyes and with a lens supporting edge 5 on the side thereof opposite the edge 4. The side wall of the eye cup is provided with an opening 6 and the said eye cup has a baffle plate 7 secured thereto and overlying the opening. This arrangement is common practice in the prior art for providing ventilation for the eye cups. The portion of the eye cup adjacent the lens supporting edge 5 is threaded as indicated at 8 to receive an internally threaded lens ring 9. The ring 9 is provided with a lens retaining channelled portion 10, on the side opposite the threaded portion, which is adapted to support a piece of lens medium 11 such as glass having characteristics which will absorb heat radiations and also reduce the visible spectrum and/or also provide ultra-violet absorption. Internally of the lens retaining ring 9 there is provided a suitable spacer annulus 12 which engages the under surface of the lens 11 adjacent one end thereof and which is adapted to engage and hold another piece of transparent medium 13 such as glass on a lens supporting edge 5 of the eye cup. The annulus 12 is adapted to retain the pieces of lens medium 11 and 13 in spaced relation with each other and is provided with a plurality of circumferential slots 14 aligned with vent openings 15 formed in the lens retaining ring 9 so as to permit circulation of air between said pieces of lens medium. The openings are provided with suitable shields 16 for shutting out the entrance of light through said openings.

The function of the eye protection device is as follows:

Heat radiating from materials heated to about melting point of iron, that is, about 1700 C. or 1973 K., to which individuals doing welding operations or working in foundries and so forth are exposed, has a maximum radiation at about 1.5 microns wave length. The lens medium 11 which contains infra-red absorption means such as iron in the ferrous form and other characteristics for reducing the visible spectrum and/or absorbing ultra-violet as is commonly used in the art and which is positioned before the eye of the individual, and which is adapted to intercept and absorb the excess energy of the heat radiations and if so designed will reduce the visible spectrum or absorb the ultra-violet radiations in proportions to such absorptive characteristics that the lens medium might have. The lens medium 11 in absorbing the above mentioned rays becomes heated to such an extent that in many instances its temperature is almost that of boiling water or 373 K. The lens thus heated reradiates energy with a maximum of radiation at about 7 or 8 microns wave length the same as any other ordinary material heated to roughly 373 K. This radiation is such that if the lens is placed adjacent the eyes, as is usual in the art, it will cause much discomfort and might injure the eye. With the present invention, however, a piece of clear glass or lens medium 13 is placed in spaced relation with the lens medium 11 and although clear and transparent to the visible this glass plate absorbs the very long wave radiations from the lens medium 11 and acts as a shield for preventing said radiations from reaching the eyes.

A piece of ordinary glass is quite transparent to the radiations coming from the original high temperature source like the melted iron, since the maximum point of energy of these moderately high temperature radiations is in the region at which ordinary glass is transparent, but the reradiation from the first protection glass at a temperature near the boiling point of water is only in the very long wave region where ordinary glass is opaque.

If the sequence of the lenses is reversed, no action occurs. The main absorption lens must be in front of the secondary clear glass absorption lens. Of course, a cheap clear lens is often placed in front of the main absorption lens for mechanical protection of the expensive absorption lens 11 to prevent its being damaged. This is common practice but has no appreciable effect on the absorption.

The secondary clear glass lens may, instead of being an ordinary glass lens, have some ultra-violet absorption properties to eliminate any ultra-violet rays which might come through the ventilating openings.

The secondary lens may be another heat absorptive lens of the usual type but is not necessary as an ordinary glass lens will produce the result desired.

To aid in reducing the temperature the pieces of lens medium 11 and 13 are supported in spaced relation with each other to allow air to circulate through the openings 15 between the lenses.

The gist of the invention, therefore, is to provide a lens system before the eyes having one of its elements positioned furthest from the eye provided with characteristics for absorbing infra red rays and for reducing the visible spectrum and/or having ultra violet absorbing means which when hot will reradiate a wave length which can be absorbed by clear transparent glass or other lens medium and having its element nearest the eye of clear transparent glass or other lens medium to provide transparent means for shielding the eye from said reradiations. In Fig. III there is illustrated a chart having degree divisions extending vertically thereof as indicated by the markings, 80 to 200 degrees, and designating temperature in degrees Fahrenheit and having time divisions extending horizontally thereof as illustrated by the numerals 1 to 10, inclusive, and designating time in minutes. This chart indicates, as shown by the line 16, the amount of heat which an eye would be susceptible to when covered by one of the prior art goggles now in commercial use with the lens of said goggle about 3 inches from a heat source having a temperature of approximately 1900° F. and with the said lens at the usual distance from the eye. The line 17 indicates the amount of heat to which the eye would be susceptible under the same conditions and with the eye protection device embodying the invention.

This comparison indicates that with the prior art goggle, that when the eye having the goggle thereon was exposed for one minute to such heat source the amount of heat at the eye position, at a room temperature of 82°, would be 86° as indicated at 18. After two minutes exposure as indicated at 19 the temperature of the eye position would be 91°. For three minutes as indicated at 20 would be 102°, for four minutes as indicated at 21 would be 116°, for five minutes as indicated at 22 would be 129°, for six minutes as indicated at 23 would be 142° and would increase approximately the same amounts as shown on the chart until for ten minutes, as indicated at 24, it would reach a temperature of 130°. Under the same conditions as illustrated by the line 17, the heat at the eye position for the goggle embodying the invention, would, for one minute exposure remain at room temperature, for two minutes as indicated at 25 would increase to 84°, for three minutes as indicated at 26 would be 86°, for four minutes, as illustrated at 27, would be 90° and so on until for a period of ten minutes as illustrated at 28 it would reach a temperature of approximately 120°. It will be seen that with the present invention the heat at the eye position is greatly reduced over the prior art goggle. The prior art goggle subjected to this test, and from which these comparative readings have been taken, is one which is now in common commercial use and is one which is recognized as being one of the best now obtainable.

The above comparison is given only by way of illustration as to the heat retarding function of the device embodying the invention and to illustrate its advantages over devices of a similar character which are now in common commercial use.

The means of retarding heat rays from moderately high temperature sources by intercepting said heat rays by means which when hot will reradiate a wave length that can be absorbed by ordinary glass, although shown and described as being used in an eye protection goggle, may be used in welding helmets and shields or any other devices of similar nature known in the art. From the foregoing description it will be seen that simple, efficient and economical means have been provided for shielding the eyes of an individual whose work is of such a character that the eyes are exposed to heat of high intensity so that the said individual's eyes will be protected from said heat without the necessity of having all the difficulties of the prior art involved.

Having described my invention, I claim:

1. In an eye protection device, a support adapted to be positioned before the eyes, means composed of lens medium carried by said support having ingredients therein for absorbing heat waves of a predetermined wave length and to reradiate said waves at a different controlled wave length, a normally transparent sheet-like member carried by said support in spaced relation with said first means for intercepting said reradiated waves, said normally transparent sheet-like member having characteristics which renders said member substantially opaque to heat waves of the wave length of said reradiated waves, means for excluding heat rays, other than said reradiated waves, from said sheet-like member, ventilating means in said support at a position located between the first means and the normally transparent sheet-like member and spacer means having portions lying between said lens medium and said sheet-like member in engagement with peripherally opposed sections of said member for maintaining said spaced relation throughout the periphery of said member.

2. In an eye protection device, a support adapted to be positioned before the eyes, means composed of lens medium carried by said support having ingredients for retarding heat waves of a predetermined wave length and to reradiate said waves at a different controlled wave length, a disc-like member supported in the path of said reradiated waves and in spaced relation with said first means, said member having characteristics which render said member substantially opaque to wave lengths of said reradiated waves and substantially transparent to the rays of the visible spectrum, means for excluding heat rays, other than said reradiated waves, from said disc-like member, a plurality of vent openings in the supporting means communicating with the space between said lens and said disc-like member for allowing circulation of cool air between said lens and said member and spacer means having portions lying between said lens medium and said disc-like member in engagement with peripherally opposed sections of said member for maintaining said spaced relation throughout the periphery of said member.

3. In an eye protection device, a support adapted to be positioned before the eyes, means composed of lens medium carried by said support having ingredients for retarding heat waves substantially equivalent to those radiated from molten iron and to reradiate said heat waves at a longer controlled wave length, a disc-like member supported in the path of said reradiated waves and in spaced relation with said first means, said member having characteristics which render said member substantially transparent to the rays of the visible spectrum, a plurality of vent openings in the supporting means communicating with the space between said lens and disc-like member for allowing circulation of cool air between said lens and said member, and baffle means over said vent openings for preventing the passage of light into the said support means other than through the lens means and disc-like member.

4. An eye protection device comprising a pair of eye cups having an edge portion for engaging the face about the eyes and having an opposed edge portion with attaching means adjacent said edge portion, an annular cap-like member having means for attachment with the attaching means on the eye cups adjacent one edge thereof and having lens supporting means adjacent the opposed edge thereof, means composed of transparent lens medium engaging said lens supporting means internally of the annular member, a spacer ring in said annular member and a disc of normally transparent material between said spacer ring and the adjacent front edge of the eye cup, said first means composed of lens medium having ingredients therein for retarding heat waves of a predetermined wave length and to reradiate said heat waves at a different controlled wave length, said disc of normally transparent material having characteristics which renders said material substantially opaque to heat waves of the wave length of said reradiated waves and said spacer ring and annular cap-like member having vent openings therein communicating with the space between said first means and said disc of normally transparent material, one of the aligned openings being in the form of a slot with the other of said openings being relatively small so as to compensate for variations in position thereof which might be introduced during the securing of said annular cap-like member to the attaching means of the eye cup.

5. An eye protection device comprising a pair of eye cups having an edge portion for engaging the face about the eyes and having an opposed edge portion with attaching means adjacent said edge portion, an annular cap-like member having means for attachment with the attaching means on the eye cups adjacent one edge thereof and having lens supporting means adjacent the opposed edge thereof, means composed of transparent lens medium engaging said lens supporting means internally of the annular member, a spacer ring in said annular member and a disc of normally transparent material between said spacer ring and the adjacent front edge of the eye cup, said first means composed of lens medium having ingredients therein for retarding heat waves of a predetermined wave length and to reradiate said heat waves at a different controlled wave length, said disc of normally transparent material having characteristics which renders said material substantially opaque to heat waves of the wave length of said reradiated waves and said spacer ring and annular cap-like member having vent openings therein communicating with the space between said first means and said disc of normally transparent material, one of the aligned openings being in the form of a slot with the other of said openings being relatively small so as to compensate for variations in position thereof which might be introduced during the securing of said annular cap-like member to the attaching means of the eye cup, and said annular cap-like member having baffle members overlying a portion of the vent openings therein for shunting the passage of light through said openings.

EDGAR D. TILLYER.